(12) United States Patent
Fuchte et al.

(10) Patent No.: US 12,515,811 B2
(45) Date of Patent: Jan. 6, 2026

(54) CABIN FOR AN AIRCRAFT, HAVING A MONITORING ASSEMBLY, AIRCRAFT HAVING THE CABIN, MONITORING ASSEMBLY AND METHOD FOR MONITORING A CABIN OF AN AIRCRAFT

(71) Applicants: Diehl Aerospace GmbH, Ueberlingen (DE); Diehl Aviation Laupheim GmbH, Laupheim (DE)

(72) Inventors: Joerg Fuchte, Hamburg (DE); Marcel Schmedes, Woellstadt (DE); Michael Jirsch, Wiesbaden (DE)

(73) Assignees: DIEHL AEROSPACE GMBH, Ueberlingen (DE); DIEHL AVIATION LAUPHEIM GMBH, Laupheim (DE)

( * ) Notice: Subject to any disclaimer, the term of this patent is extended or adjusted under 35 U.S.C. 154(b) by 112 days.

(21) Appl. No.: 18/021,491

(22) PCT Filed: Aug. 19, 2021

(86) PCT No.: PCT/EP2021/073042
§ 371 (c)(1),
(2) Date: Feb. 15, 2023

(87) PCT Pub. No.: WO2022/038227
PCT Pub. Date: Feb. 24, 2022

(65) Prior Publication Data
US 2024/0017848 A1    Jan. 18, 2024

(30) Foreign Application Priority Data
Aug. 20, 2020   (DE) ......................... 102020210572.3

(51) Int. Cl.
*B64D 45/00* (2006.01)
*B64D 11/00* (2006.01)

(52) U.S. Cl.
CPC .............. *B64D 45/00* (2013.01); *B64D 11/00* (2013.01); *B64D 2045/007* (2013.01)

(58) Field of Classification Search
None
See application file for complete search history.

(56) References Cited

U.S. PATENT DOCUMENTS 8,806,543 B1 *   8/2014   Curtis ................ G06Q 30/0241
                                                                725/77
9,302,781 B2     4/2016   Jouper et al.
(Continued)

FOREIGN PATENT DOCUMENTS

DE   202020102795 U1 *   7/2020
EP   2738060 A1          6/2014
RU   2720849 C2 *        5/2020   ............... B60N 2/00

OTHER PUBLICATIONS

International Search Report dated Dec. 1, 2021 issued in PCT/EP2021/073042.

*Primary Examiner* — Fekadeselassie Girma
(74) *Attorney, Agent, or Firm* — Scully, Scott, Murphy & Presser, P.C.

(57) ABSTRACT

In order to control a flow of persons and to implement distancing rules in a cabin (1) for an aircraft, a cabin (1) having a first monitored region (11) and a second monitored region (14) is provided. The cabin (1) has a monitoring assembly (10) for monitoring the first monitored region (11) and the second monitored region (14). The monitoring assembly (10) comprises at least one output device (25), which is designed and/or arranged to output an authorization signal (26) and/or a prohibition signal (27) regarding a change in a position and/or presence of at least one person in the first monitored region (11) and/or in the second monitored region (14).

9 Claims, 3 Drawing Sheets

(56) References Cited

U.S. PATENT DOCUMENTS

| | | | |
|---|---|---|---|
| 9,881,469 B2* | 1/2018 | Guerzoni | G08B 13/00 |
| 10,803,848 B1* | 10/2020 | Troy | H04R 1/342 |
| 11,037,074 B2* | 6/2021 | Taylor | G06Q 10/06 |
| 2012/0010910 A1* | 1/2012 | Lele | G06Q 40/00 |
| | | | 705/5 |
| 2012/0010912 A1* | 1/2012 | Lele | G06Q 10/00 |
| | | | 705/5 |
| 2016/0086495 A1* | 3/2016 | Lagarde | G08G 5/21 |
| | | | 701/4 |
| 2017/0316664 A1 | 11/2017 | Gerard | |
| 2019/0177004 A1* | 6/2019 | Skelly | G06T 5/00 |
| 2020/0031474 A1 | 1/2020 | Sivignon et al. | |
| 2020/0169844 A1 | 5/2020 | Forest | |
| 2021/0001984 A1* | 1/2021 | Nicks | B64D 11/00 |
| 2021/0031924 A1* | 2/2021 | Dowty | B60Q 3/00 |
| 2021/0322589 A1* | 10/2021 | Matter | A61L 2/26 |
| 2021/0390804 A1* | 12/2021 | Rajamanickam | A61B 5/0008 |
| 2021/0390812 A1* | 12/2021 | Chaurasia | G07C 9/20 |
| 2021/0391089 A1* | 12/2021 | Eswara | G06V 20/53 |
| 2021/0398239 A1* | 12/2021 | Annakov | G06Q 30/0601 |
| 2022/0198906 A1* | 6/2022 | Pollard | G08B 7/06 |
| 2022/0326339 A1* | 10/2022 | Cuddihy | G01S 5/0257 |
| 2023/0278577 A1* | 9/2023 | Shimizu | B60S 1/56 |
| | | | 340/439 |
| 2024/0017848 A1* | 1/2024 | Fuchte | B64D 47/02 |

* cited by examiner

Fig. 2

CABIN FOR AN AIRCRAFT, HAVING A MONITORING ASSEMBLY, AIRCRAFT HAVING THE CABIN, MONITORING ASSEMBLY AND METHOD FOR MONITORING A CABIN OF AN AIRCRAFT

The invention relates to a cabin for an aircraft with a monitoring assembly for monitoring a first monitored region and a second monitored region. The invention further relates to a monitoring assembly for monitoring a cabin of an aircraft, an aircraft having the cabin, and a method for monitoring a cabin of an aircraft.

Aircraft are already known in which monitoring systems are used to monitor seats. For example, document DE 10 2006 042 299 A1 describes a conditional warning and reporting system for an aircraft cabin to determine the cabin status. As part of a monitoring method for monitoring a seat status, a seat occupancy status of a seat element is measured by means of a seat occupancy sensor and a seatbelt status of the seat element is measured by means of a seatbelt sensor and these are transmitted to a monitoring device. This can generate a warning signal in the event of a combination of a predetermined seat occupancy status and seatbelt status.

It is the object of the invention to provide a cabin with a functionally extended monitoring assembly. This object is achieved by a cabin for an aircraft with a monitoring assembly having the features of claim 1, by a monitoring assembly for integration into a cabin of an aircraft, by an aircraft with the cabin, and by a method for monitoring a cabin of an aircraft. Preferred or advantageous embodiments of the invention can be found in the claims, the description and/or the accompanying figures.

A cabin for an aircraft, in particular for civil aviation, is proposed. For example, the cabin is designed as a passenger cabin with at least one washroom and/or with at least one entrance door through which the aircraft and/or the cabin can be entered.

The cabin has a first monitored region and a second monitored region. The cabin comprises a monitoring assembly. The monitoring assembly is designed to monitor the first monitored region and the second monitored region. Preferably, the monitoring assembly is designed to monitor and/or control a flow of people in the cabin. In particular, the monitoring assembly is designed to monitor and control how many people are in which position in the first monitored region and in the second monitored region and/or how many people are in the first and/or second monitored region.

The monitoring assembly comprises at least one output device. The at least one output device is designed and/or arranged to output an authorization signal or a prohibition signal regarding a change in the position and/or a presence of at least one person in the first monitored region and/or in the second monitored region. Preferably, the authorization signal can be/is output by the at least one output device if a change in the position and/or the presence of at least one person in the first monitored region and/or in the second monitored region is permitted or allowed. In particular, the prohibition signal can be/is output by the at least one output device if a change in the position and/or the presence of at least one person in the first monitored region and/or in the second monitored region is inadmissible or prohibited.

Advantageously, the flow of people in the cabin, which is formed for example by passengers, crew and/or on-board personnel stopping and/or moving in the cabin, can be controlled by the output of the authorization signal or the prohibition signal. In this way, compliance with necessary distances between people can be ensured, for example in order to prevent an infection event between the people. In particular, accumulations of several people in narrow regions of the cabin can be avoided.

In a preferred embodiment of the invention, the authorization signal and/or the prohibition signal is or comprises an optical signal. Optionally, the output device is designed as a luminaire. Preferably, the luminaire emits the optical signal in the form of light and/or it emits the optical signal as a symbol, in particular as an illuminated symbol. In particular, the luminaire can be an on-off luminaire, which can indicate either the prohibition signal or the authorization signal. Preferably, the luminaire indicates the prohibition signal. When this goes out, it signifies the authorization to change the position and/or presence of the at least one person in the particular monitored region.

It is particularly preferred in the context of the invention that the output device is formed as a traffic light. Preferably, the traffic light is designed to display a first signal color as the authorization signal. The first signal color can, for example, be the color green. In particular, the traffic light is designed to display a second signal color as the prohibition signal. The second signal color can be, for example, the color red. The output device as traffic light may optionally display a third signal color. The third signal color can be, for example, the color orange. Preferably, the third signal color symbolizes a wait signal, which indicates to the at least one person that the prohibition signal or the authorization signal will go out soon.

Optionally, the output device is designed to output at least one acoustic signal in addition to the optical signal. The acoustic signal can be, for example, a noise, a tone, a sequence of tones, or a voice message. It can alert the at least one person to the output of the optical signal and can thus prevent the prohibition signal and/or the authorization signal from being missed. Preferably, the acoustic signal, for example in the form of an advisory tone, sounds simultaneously or almost simultaneously with the display of the optical signal. It is also possible that the acoustic signal is adapted to the displayed optical signal. In particular, a prohibition advisory tone sounds when the prohibition signal is displayed and a different authorization advisory tone sounds when the authorization signal is displayed.

In one possible embodiment of the invention, the cabin comprises a seating region having a plurality of seats. Preferably, passengers of the aircraft may be seated on the seats. Preferably, the monitoring assembly comprises a plurality of output devices. In particular, exactly one output device is assigned to several seats, preferably all seats, of the seating region. Preferably, the particular output device is arranged above the seat in the cabin. For example, the output device is integrated in the supply duct of the cabin, which is arranged in particular in an overhead region of the assigned seat. In particular, ventilation openings and/or indicators such as seatbelt signs can also be integrated in the supply duct and/or overhead region. Thus, the person sitting on the particular seat can easily recognize the authorization signal or prohibition signal issued by the output device.

In a preferred embodiment of the invention, the first monitored region comprises at least one aisle which is arranged between and/or extends between the seats of the seating region. In particular, passengers of the aircraft move from the seats through the aisle to enter at least one lounge and/or functional region of the aircraft and from the lounge and/or functional region back to the seats.

In another preferred embodiment of the invention, the second monitored region comprises the lounge and/or functional region of the aircraft. This can be, for example, at least one washroom of the cabin and/or at least one waiting region in front of the washroom. Alternatively or optionally additionally, the lounge and/or functional region can comprise an entrance and/or exit region of at least one aircraft door of the cabin.

It is possible within the scope of the invention that the cabin comprises at least one further monitored region. The at least one further monitored region preferably comprises several or all seats of the seating region.

In a preferred constructive implementation of the invention, the monitoring assembly comprises a first sensor device. Preferably, the first sensor device is designed and/or arranged to detect the presence and/or position of at least one person in the first monitored region as first sensor data. Preferably, the one or more first sensors are designed and/or arranged to detect whether at least one person is present in and/or walking along the at least one aisle between the seats of the seating region. For this purpose, the first sensor or sensors can be integrated, for example, in a cabin ceiling and/or cabin wall. Alternatively or optionally additionally, the first sensor or sensors can be integrated in the region of an overhead luggage compartment and/or in a lateral seat structure, in particular facing the at least one aisle, of several or all seats.

In another preferred constructive implementation of the invention, the monitoring assembly comprises a second sensor device. Preferably, the second sensor device is designed and/or arranged to detect the presence and/or position of at least one person in the second monitored region as second sensor data. For example, the second sensor device comprises one or more second sensors. Preferably, the at least one further sensor device is designed and/or arranged to detect a position and/or presence of at least one person in the at least one further monitored region as further sensor data. Preferably, the second sensors are designed and/or arranged to detect whether at least one person is present in the at least one further lounge and/or functional region of the cabin, in particular in the at least one washroom, in the waiting region in front of the particular washroom and/or in the entrance and/or exit region of the aircraft door. For this purpose, the second sensor or sensors can be integrated, for example, in a cabin ceiling and/or cabin wall, in the waiting region, in the washroom, and/or in the entrance and/or exit region. Alternatively or optionally additionally, the second sensor or sensors can be arranged on an access door to the washroom and/or on equipment in the corresponding regions.

Optionally additionally, the monitoring assembly comprises at least one further sensor device. Preferably, the at least one further sensor device is designed and/or arranged to detect the presence and/or position of at least one person in the at least one further monitored region as further sensor data. For example, the at least one further sensor device comprises a plurality of further sensors. Preferably, one or more of the further sensors are assigned to exactly one seat of the seating region. In particular, the further sensors are designed and/or arranged to detect a seat occupancy of the particular seat. For this purpose, the further sensor or sensors can be integrated as pressure sensors, for example in a seat cushion of the particular seat. It is also possible within the scope of the invention for the further sensor or sensors to be arranged as distance sensors, for example so-called time-of-flight sensors, above the seat or the row of seats, for example in a supply duct (passenger supply channel, PSC).

In a preferred constructive implementation of the invention, the monitoring assembly has an evaluation device. The evaluation device is, for example, a microcontroller. Preferably, the evaluation device is designed to calculate a distance between at least one person in one of the monitored regions and at least one other person in another of the monitored regions. In particular, the evaluation device is designed to calculate the distance between the at least one person and the at least one other person on the basis of the first sensor data, the second sensor data and/or the further sensor data.

In a further preferred implementation of the invention, the evaluation device is designed to evaluate a seat occupancy of the seats on the basis of the further sensor data. In particular, the seat occupancy can indicate which seats of the seating region are occupied by a person, for example a passenger, a crew member and/or a member of the on-board personnel, and which are unoccupied.

For example, the evaluation device is integrated in a mobile computer, for example in a tablet or smartphone, or is connected and/or connectable to it by cable or wirelessly. Alternatively, the evaluation device can be integrated in a permanently installed computer or connected and/or connectable to it by cable or wirelessly. Preferably, the computer has a display or a screen. In particular, the seat occupancy of the seats and/or the calculated distances can be called up and/or displayed on the display or on the screen. It is also possible within the scope of the invention for an overview to be displayable of how often and/or to which seats the prohibition signal or the authorization signal is output.

The evaluation device in the form of a computer can, for example, be assigned to and/or used by on-board personnel and/or a crew of the aircraft. Advantageously, the on-board personnel and/or crew can get a quick and reliable overview of how many passengers are already sitting on their seat and/or in which seat rows these seats are located on the basis of the displayed seat occupancy and/or distances. In particular, the on-board personnel and/or crew can obtain information about the flow of people in the cabin and, if necessary, can take appropriate measures to maintain necessary distances between passengers and/or to avoid congestion.

It is particularly preferred in the context of the invention that the at least one output device for outputting the authorization signal and/or the prohibition signal can be controlled by the computer. For this purpose, the computer is connected to the at least one output device, for example via WiFi or Bluetooth. In particular, the on-board personnel and/or crew can control the at least one output device by means of the computer to output the prohibition signal or the authorization signal for one, some or all seats. In particular, based on the seat occupancy and/or distances output on the display or screen, the on-board personnel and/or crew can control the flow of people in the cabin by outputting the authorization signal or the prohibition signal. For example, by actuating the prohibition signal, passengers can be prevented from getting up from their seats after landing and stepping onto the aisle before the aircraft has reached its final parked position and is stationary.

For example, the on-board personnel and/or crew can use the computer to control the authorization signal for specific seats and/or rows of seats in the seating region, for example first for the outermost seat of each third row of seats. Afterwards, the on-board personnel and/or crew can control the authorization signal, for example for a middle seat of each third row of seats and subsequently for a rear seat of each third row of seats. In the following, individual seats of other seat rows, for example, can successively receive the authorization signal. By successively outputting the authorization signal for specific seats and seat rows, the necessary distance between passengers can be controlled and maintained, for example during a disembarkation process. Thus, it can be prevented, in particular during the disembarkation process, that all passengers simultaneously get up from their seats, step onto the aisle and/or search for their luggage. In particular, it can be avoided that all passengers move simultaneously or in close succession on the at least one aisle towards the aircraft door. The disembarkation process can thus be more relaxed and safer for the passengers as well as for the crew and/or the on-board personnel.

In particular, the on-board personnel and/or the crew have the possibility to exert influence by controlling the at least one output device according to the situation and to prevent congestion and queuing in the at least one aisle, for example when passengers are boarding or disembarking, and/or to prevent crowding in the at least one further lounge and/or functional region.

In a preferred embodiment of the invention, the monitoring assembly has a control device. Preferably, the control device is connectable and/or connected to the evaluation device for signal exchange. In particular, the evaluation device transmits the calculated distance as distance signals to the control device. The control device is preferably designed to actuate the at least one output device in dependence on the calculated distance for outputting the prohibition signal or the authorization signal. Preferably, a control algorithm for actuation by the control device is stored in the control device and/or in the at least one output device. In particular, the output device can be controlled in an algorithm-based manner and/or manually, by means of the computer operated by the on-board personnel and/or the crew, to output the authorization signal or the prohibition signal.

Advantageously, the flow of people in the cabin can be controlled automatically, in particular in accordance with the stored algorithm, by calculating the distance and outputting the authorization signal or the prohibition signal in dependence thereon, in particular in the first and second monitored regions and optionally additionally in the at least one further monitored region. In this way, it can be achieved in an advantageous manner that the people in the individual monitored regions keep a sufficient distance from one another, in particular in order to prevent an infection event, for example in the event of a pandemic. Furthermore, an accumulation of people in certain regions of the cabin and a long waiting time associated with this, for example in the waiting region in front of the washroom, can be prevented.

In a preferred embodiment of the invention, the evaluation device is connectable and/or connected to an external device. For example, the external device is associated with an external entity, such as ground crew of the aircraft. Preferably, the evaluation device is designed to transmit the seat occupancy of the seats in the seating region and/or the calculated distance between the people in the monitored regions to the external device. By outputting this information, for example a boarding process prior to the departure of the aircraft can be supported by the external device. In particular, the external device can output how many people are currently boarding the aircraft, how many people have already taken their seats, and/or how many people are in the aisle or in the at least one other lounge and/or functional region of the cabin. Thus, a situation in which several people are standing together in a confined space and/or in which long queues are formed can be avoided. In particular, this can ensure comfort for the passengers when boarding the aircraft and protection of the passengers from the infection event.

A monitoring assembly for monitoring a cabin of an aircraft forms a further subject of the invention. Preferably, the monitoring assembly is designed for integration and/or use in the cabin according to the previous description and/or according to one of claims 1-9.

The monitoring assembly comprises a first sensor device. The first sensor device has a plurality of first sensors. The first sensor device and/or the first sensors are designed to detect a position and/or presence of at least one person in a first monitored region of the cabin as first sensor data.

The monitoring assembly comprises a second sensor device. The second sensor device has one or more second sensors. The second sensor device and/or the second sensor(s) are designed to detect a position and/or presence of at least one person in a second monitored region of the cabin as second sensor data.

The monitoring assembly has an evaluation device. The evaluation device is designed to calculate a distance between the people in the monitored regions on the basis of the first and second sensor data.

The monitoring assembly comprises a control device. The control device is designed to control at least one output device on the basis of the calculated distance.

The monitoring assembly comprises at least one output device. The at least one output device is designed to output an authorization signal or a prohibition signal regarding a change in the position and/or presence of at least one person in the monitored regions in dependence on the calculated distance.

An aircraft having the cabin according to the previous description and/or according to one of claims 1 to 9 forms another subject of the invention.

A further subject of the invention is a method for monitoring a cabin of an aircraft, preferably with the monitoring assembly according to the previous description. Preferably, the cabin to be monitored is designed according to the previous description and/or according to one of claims 1 to 9.

Within the scope of the method, an authorization signal or a prohibition signal regarding a change in a position and/or presence of at least one person in a first monitored region of the cabin and/or in a second monitored region of the cabin is output.

Further features, effects and advantages of the invention can be found in the following description of a preferred embodiment of the invention and the accompanying figures, in which.

Matching or like parts are provided in the figures with the same reference signs provided.

Figure 1:
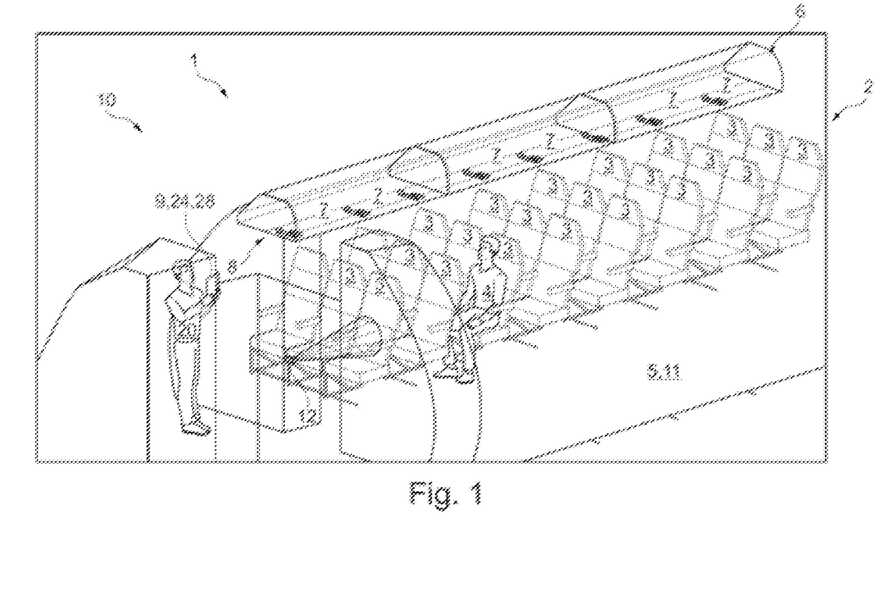
FIG. 1 shows a cabin of an aircraft with a first monitored region, which is monitored by a first sensor device.

In FIG. 1, a cabin 1 of an aircraft for civil aviation is shown from above at an angle. The cabin 1 is designed as a passenger cabin. It has a seating region 2 with a plurality of seats 3, which are arranged in rows of several seats, for example three seats. Passengers 4 of the aircraft can be seated on the seats 3. The cabin 1 can comprise one, two or more seating regions 2. Between the seating regions 2 or next to the seating region(s) 2 there runs an aisle 5, which passengers can walk along to get to their seats 3 or from their seats to a lounge and/or functional region 13 (see FIG. 2) of the cabin 1.

An overhead region 6 with overhead luggage compartments 7 is arranged above the seat region 2. On an underside of the overhead region 6 facing the seats 3, a supply duct 8 or passenger supply channel extends across the rows of seats. Integrated in the supply channel 8 are, for example, air vents and seatbelt signs for each row of seats or for each seat 3 in the row of seats.

The cabin 1 comprises a mobile computer 9, for example a tablet or laptop. The computer 9 has a display. Alternatively, the computer can be a stationary computer with a display. A member of the on-board personnel 20 located in the cabin 1 uses and/or operates the computer 9.

Figure 3:
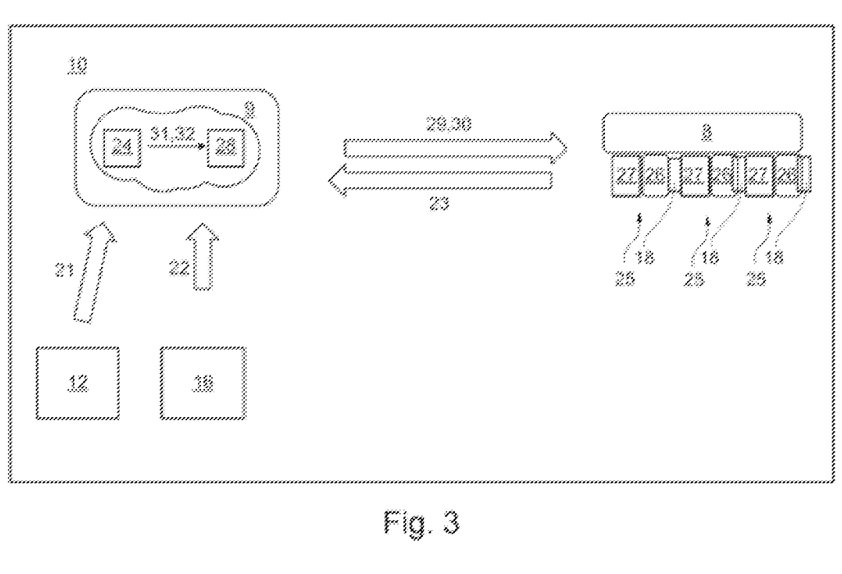
FIG. 3 shows a schematic layout of a monitoring assembly for monitoring monitored regions of the cabin.

The cabin 1 has a monitoring assembly 10 for monitoring monitored regions 11, 14, 17 of the cabin 1. A schematic layout of the monitoring assembly 10 is shown in FIG. 3.

The cabin 1 has a first monitored region 11. The first monitored region 11 is formed by and/or includes the aisle 5.

The monitoring assembly 10 has a first sensor device 12. The first sensor device 12 comprises one or more first sensors, which are arranged on the wall, ceiling and/or floor in the cabin 1 and can form a sensor network. The first sensor or sensors are designed, for example, as optical sensors, for example as cameras, optionally as so-called time-of-flight sensors.

The first sensor device 12 detects a position and/or presence of at least one person, in particular at least one passenger 4 or member of a crew or on-board personnel 20, in the first monitored region 11 as first sensor data 21. In particular, the first sensor device 12 detects whether and/or how many people are present in the aisle 5, whether and/or how many people have entered the aisle 5, and whether and/or how many people have left the aisle 5.

Figure 2:
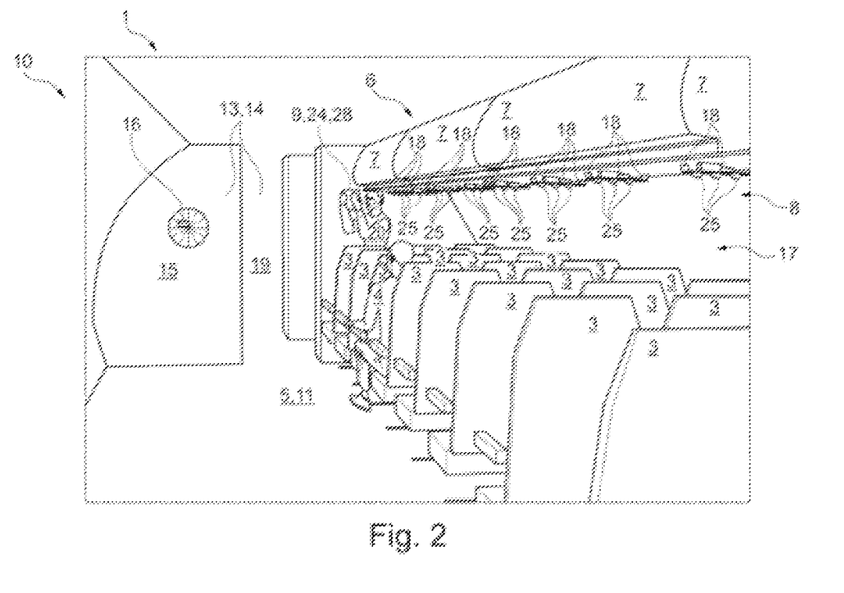
FIG. 2 shows the cabin with the first monitored region and with a second and a third monitored region, which are monitored by a second and a third sensor device.

In FIG. 2, the cabin 1 is shown in a view of rear sides of the seats 3 along the aisle 5. The cabin 1 has the lounge and/or functional region 13. The lounge and/or functional region 13 comprises a washroom 15 spatially separated from the seating region 2 and a waiting region 19 in front of the washroom 15. The lounge and/or functional region 13 can optionally additionally comprise an entrance and/or exit region, not shown, of an aircraft door.

The cabin 1 has a second monitored region 14. The second monitored region 14 is formed by and/or comprises the lounge and/or functional region 13.

The monitoring assembly 10 has a second sensor device 16. The second sensor device 16 comprises one or more second sensors, which can form a sensor network. The second sensor or sensors are designed, for example, as optical sensors, for example as cameras, optionally as so-called time-of-flight sensors. The one or more second sensors are arranged in the washroom 15 on the wall, ceiling, or floor. One or more other second sensors may optionally be additionally arranged on the wall, ceiling or floor in the waiting region 19 and/or in the entrance and/or exit region of the aircraft door. One or more second sensors can also be arranged at an access door to the washroom 15. These can, for example, be in the form of motion sensors and can detect a door opening and closing motion, thereby enabling an occupancy or non-occupancy of the washroom 15 to be evaluated. However, the second sensor or sensors arranged at the access door can also be designed as the optical sensors.

The second sensor device 16 detects a position and/or presence of at least one person in the second monitored region 14 as second sensor data 22. Thus, the second sensor device 16 detects whether and/or how many people are present in the lounge and/or functional region 13, whether and/or how many people have entered the lounge and/or functional region 13, and whether and/or how many people have left the lounge and/or functional region 13.

The cabin 1 has at least one further monitored region, in particular a third monitored region 17. The third monitored region 17 is formed by the seat region 2 or by the seat regions 2.

The monitoring assembly 10 has at least one further sensor device, in particular a third sensor device 18. The third sensor device 18 comprises a plurality of third sensors forming a sensor network. The third sensor or sensors are designed, for example, as optical sensors, for example as cameras, optionally as so-called time-of-flight sensors. The third sensors are arranged in the supply channel 8. A third sensor is assigned to each seat 3 of the seating region 2, alternatively to each row of seats. The third sensor device 18, in particular the third sensor assigned to the particular seat 3, detects a seat occupancy of the seat 3 by a person as third sensor data 23.

The monitoring device 10 has an evaluation device 24 for evaluating the first, second and third sensor data 21, 22, 23. The evaluation device 24 is designed as a microcontroller. It is integrated in the computer 9. Alternatively, it can be a separate component which is connected and/or connectable to the computer 9, for example via radio or a cable.

The evaluation device 24 calculates, on the basis of the first and second sensor data 21, 22 and optionally additionally on the basis of the third sensor data 21, 22, a distance between people who are in the first and second monitored regions 11, 14 and optionally additionally in the third monitored region 17. The evaluation device 24 also evaluates the seat occupancy of the seats 3, in particular it evaluates whether and on which seats 3 of the seat region 2 a person is sitting and whether and which seat(s) are unoccupied.

The computer 9 can be connected for signal and/or data exchange to an external device, for example a further computer, outside the aircraft, which is used for example by ground crew at an airport. The evaluated seat occupancy and optionally additionally the calculated distance of the people in the monitored regions 11, 14, 17 can be transmitted to the further computer. This allows the ground crew to gain an impression, for example during a boarding process, of how quickly the passengers in the cabin 1 sit down on their seat 3, which seats 3 are already occupied, and how many people are in the aisle 5, waiting region 19 and/or in the entrance and/or exit region of the aircraft door and at what distance. In this way, the ground crew can organize the boarding process in a more advantageous manner, in particular avoiding passenger congestion in the monitored regions and/or avoiding queues in front of the aircraft door.

The monitoring device 10 comprises at least one, in particular several output devices 25. The output devices 25 are arranged above each row of seats of the seat region 2 in the supply duct 8. The output devices 25 are assigned to exactly one seat 3 each of the seat row.

The output devices 25 are designed as traffic lights for outputting two or more optical signals of different colors. A first signal color output by means of the traffic light, for example green, forms an authorization signal 26. A second signal color output by means of the traffic light, for example red, forms a prohibition signal 27. Optionally, a third signal color, for example orange, can be output, which can form a wait signal until the change between the authorization signal 26 and the prohibition signal 27. It is also possible that the output devices 25 are designed to output acoustic signals, which can indicate the output and the change between the optical signals.

The authorization signal 26 and the prohibition signal 27 are provided to influence the position and/or presence of at least one person in the monitored regions 11, 14, 17. The prohibition signal 27 signals to the passenger on the corresponding seat 3 that they must remain seated and may not leave the seat 3. The authorization signal 26 signals to the passenger on the corresponding seat 3 that they may get up and leave the seat 3.

The monitoring assembly 10 comprises a control device 28 for actuating the output devices 25 on the basis of the calculated distance between the people in the monitored regions 11, 14, 17. The control device 28 is integrated in or connectable or connected to the computer 9. A control algorithm is stored in the control device 28, by means of which the output devices 25 can be controlled on the basis of the calculated distance using algorithm-based control signals 29. For example, the control algorithm comprises limit values for a minimum distance between, in each case, two people in one, several or all monitored regions 11, 14, 17. If the limit value is reached or dropped below, the control device 28 actuates the output of the prohibition signal 27 for the corresponding seats 3. If the limit value is not reached, the control device actuates the authorization signal 26 for the corresponding seats 3. According to the control algorithm, the control device 28 can also take into account, for example, the distance between two people and certain seats 3 and/or rows of seats, so that the control device can control the authorization signal 26 at certain rows of seats and the prohibition signal 27 at other rows of seats.

Thus, a close accumulation of people in the first and second monitored regions 11, 14 can be avoided in an advantageous manner. It can thus be ensured that distancing rules are observed, for example to reduce the incidence of infection in the event of a pandemic or similar situations.

By means of the computer 9 and in particular by means of the control device 28 integrated therein or connected thereto, the member of the on-board personnel 20 can also actuate the output devices 25 by carrying out manual control commands. For this purpose, the calculated distance and/or the evaluated seat occupancy can be shown on the display so that the member of the on-board personnel 20 can take note of it. The control commands can be entered via the display as a touch screen or via a keyboard, etc.

For example, the member of the on-board personnel 20 can influence a disembarkation process of the passengers 4 from the aircraft by manually controlling the output devices In particular, when the authorization signal 26 is actuated, for example, only for the seats 3 of each third row of seats in the seating region 2, it can be achieved that not all passengers 4 simultaneously crowd onto the aisle 5 to remove their luggage from the overhead storage compartments 7 and move toward the aircraft door. The disembarkation process can proceed in an orderly fashion, making it more relaxed and pleasant for the passengers 4 and the flight crew 20. In addition, close congregations can be avoided and any necessary distancing rules can be observed in the first and second monitored regions 11, 14.

As can be seen from FIG. 3, the evaluation device 24 is connected to the first, second and third sensor devices 12, 16, 18 for signal exchange. The sensor devices 12, 16, 18 transmit the detected first, second and third sensor data 21, 22, 23 to the evaluation device 24.

The evaluation device 24 is connected to the control device 28 for signal exchange. It transmits the calculated distance as distance signals 31 to the control device 28. It can also transmit the calculated distance as distance signals for display on the display of the computer 9. Furthermore, the evaluation device 24 transmits the evaluated seat occupancy as seat occupancy signals 32 to the control device 28 and/or for display on the display of the computer 9.

The control device 28 is connected to the output devices 25 via radio, in particular WiFi or Bluetooth. For actuation, the control device 28 sends the algorithm-based control signals 29 or control signals 30 based on the manual control commands to the output devices 24.

LIST OF REFERENCE SIGNS 1 cabin
2 seating region
3 seat
4 passenger
5 aisle
6 overhead region
7 overhead luggage compartments
8 supply duct
9 computer
10 monitoring assembly
11 first monitored region
12 first sensor device
13 lounge and/or functional region
14 second monitored region
15 washroom
16 second sensor device
17 third monitored region
18 third sensor device
19 waiting region
20 on-board personnel
21 first sensor data
22 second sensor data
23 third sensor data
24 evaluation device
25 display devices
26 authorization signal
27 prohibition signal
28 control device
29 algorithm-based control signals
30 manual control signals
31 distance signals
32 seat occupancy signals

The invention claimed is:

1. A cabin for an aircraft,
with a first monitored region,
with a second monitored region,
with a monitoring assembly for monitoring the first monitored region and the second monitored region,
wherein the monitoring assembly comprises at least one output device,
wherein the at least one output device is designed and/or arranged to output an authorization signal and/or a prohibition signal regarding a change in a position and/or presence of at least one person in the first monitored region and/or in the second monitored region, wherein the cabin comprises a seating region with a plurality of seats, wherein the monitoring assembly comprises a plurality of output devices, wherein an output device is assigned to each seat of the seating region, wherein the first monitored region is at least one aisle next to or between the seats of the seating region, and/or the second monitored region comprises at least one stay and/or functional region of the cabin, wherein the cabin comprises at least one further monitored region, wherein the at least one further monitored region comprises the seat region, wherein the monitoring assembly comprises a first sensor device and a second sensor device, wherein the first sensor device is designed and/or arranged to detect the presence and/or position of at least one person in the first monitored region as first sensor data, and wherein the second sensor device is designed to detect the presence and/or position of at least one person in the second monitored region as second sensor data, and wherein the monitoring assembly comprises at least one further sensor device, wherein the at least one further sensor device is designed to detect a position and/or presence of at least one person in the at least one further monitored region as further sensor data.

2. The cabin as claimed in claim 1, wherein the authorization signal and/or the prohibition signal is an optical signal.

3. The cabin as claimed in claim 1, wherein the at least one output device is a traffic light which is designed to display a first signal color as the authorization signal and to display a second signal color as the prohibition signal.

4. The cabin as claimed in claim 1, wherein the monitoring assembly comprises an evaluation device, wherein the evaluation device is designed to calculate a distance between at least one person in one of the monitored regions and at least one other person in another of the monitored regions on the basis of the first sensor data, the second sensor data and/or the further sensor data.

5. The cabin as claimed in claim 4, wherein the evaluation device is designed to evaluate a seat occupancy of the seats on the basis of the further sensor data.

6. The cabin as claimed in claim 5, wherein the evaluation device is integrated in and/or connected to a mobile or permanently installed computer, wherein the computer has a display or a screen, wherein the evaluated seat occupancy and/or the calculated distance can be called up and/or displayed on the display or on the screen.

7. The cabin as claimed in claim 6, wherein the monitoring assembly comprises a control device, wherein the control device is connectable and/or connected to the evaluation device for signal exchange, wherein the control device is designed to output the at least one output device in dependence on the calculated distance for outputting the authorization signal or the prohibition signal.

8. The cabin as claimed in claim 6, wherein the evaluation device and/or the computer is connectable and/or connected to an external device, wherein the evaluation device and/or the computer is/are designed to transmit the seat occupancy and/or the calculated distance to the external device.

9. An aircraft with the cabin as claimed in claim 1.

* * * * *